United States Patent
Lin et al.

(10) Patent No.: US 12,526,712 B2
(45) Date of Patent: Jan. 13, 2026

(54) MULTIPLE SUBSCRIBER IDENTITY MODULE (SIM) USER EQUIPMENT (UE) FORCED RADIO ACCESS TECHNOLOGY (RAT) SELECTION

(71) Applicant: QUALCOMM Incorporated, San Diego, CA (US)

(72) Inventors: Daowei Lin, Shenzhen (CN); Zengran Wan, Beijing (CN); Xin Jiang, Shenzhen (CN); Weifeng Deng, Shenzhen (CN); Boting Wang, Beijing (CN); Jun Deng, Shanghai (CN); Hewu Gu, Shanghai (CN); Xiaochen Chen, Beijing (CN); Zengyu Hao, Beijing (CN); Ling Xie, Beijing (CN); Tom Chin, San Diego, CA (US); Zhongyue Lou, Beijing (CN); Bhupesh Manoharlal Umatt, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 18/548,057

(22) PCT Filed: May 6, 2021

(86) PCT No.: PCT/CN2021/091882
§ 371 (c)(1),
(2) Date: Aug. 25, 2023

(87) PCT Pub. No.: WO2022/232985
PCT Pub. Date: Nov. 10, 2022

(65) Prior Publication Data
US 2024/0137829 A1   Apr. 25, 2024
US 2024/0236795 A9   Jul. 11, 2024

(51) Int. Cl.
*H04W 36/14* (2009.01)
*H04W 48/18* (2009.01)

(52) U.S. Cl.
CPC ........ *H04W 36/144* (2023.05); *H04W 48/18* (2013.01)

(58) Field of Classification Search
CPC ............................ H04W 36/144; H04W 48/18
See application file for complete search history.

(56) References Cited

U.S. PATENT DOCUMENTS 9,237,593 B2 * 1/2016 Kirveskoski .......... H04W 76/15
9,319,977 B2   4/2016 Nayak et al.
(Continued)

FOREIGN PATENT DOCUMENTS

EP   3644635 A1 *  4/2020   ............ H04W 76/15
EP   3937557 A1 *  1/2022   .............. H04W 8/22
(Continued)

OTHER PUBLICATIONS

International Search Report and Written Opinion—PCT/CN2021/091882—ISA/EPO—Feb. 9, 2022.

*Primary Examiner* — Julio R Perez
(74) *Attorney, Agent, or Firm* — QUALCOMM Incorporated

(57) ABSTRACT

A method of wireless communication by a user equipment (UE) supporting multiple subscriptions, includes camping on a first cell of a first radio access technology (RAT) with a first data subscription, and camping on a second cell of a second RAT with a second data subscription. The method also includes triggering a transition to the first cell of the first RAT for the second data subscription. The method further includes performing, with the first data subscription, activities on behalf of the second data subscription.

30 Claims, 7 Drawing Sheets

(56) References Cited

U.S. PATENT DOCUMENTS

| | | | |
|---|---|---|---|
| 9,338,713 B2 | 5/2016 | Chakravarthy et al. | |
| 9,491,276 B2 | 11/2016 | Kanamarlapudi et al. | |
| 9,820,091 B1 | 11/2017 | Kumar et al. | |
| 9,832,709 B2* | 11/2017 | Bergström | H04W 48/18 |
| 11,445,414 B2 | 9/2022 | Ukil et al. | |
| 12,133,281 B2* | 10/2024 | Sun | H04W 68/02 |
| 2011/0117962 A1* | 5/2011 | Qiu | H04W 48/18 |
| | | | 455/558 |
| 2014/0295831 A1 | 10/2014 | Karra et al. | |
| 2014/0342728 A1 | 11/2014 | Dhanda et al. | |
| 2015/0141006 A1* | 5/2015 | Walke | H04W 8/18 |
| | | | 455/434 |
| 2015/0296364 A1* | 10/2015 | Peruru | H04W 88/06 |
| | | | 455/434 |
| 2015/0327159 A1* | 11/2015 | Gude | H04W 48/18 |
| | | | 455/434 |
| 2016/0044582 A1* | 2/2016 | Pasumarthi | H04W 48/16 |
| | | | 455/434 |
| 2016/0302114 A1 | 10/2016 | Jain et al. | |
| 2016/0373948 A1 | 12/2016 | Sanka et al. | |
| 2017/0048773 A1 | 2/2017 | Miao et al. | |
| 2017/0208603 A1* | 7/2017 | Goel | H04W 72/56 |
| 2017/0325144 A1 | 11/2017 | Raghunathan et al. | |
| 2018/0109978 A1 | 4/2018 | Zhao et al. | |
| 2019/0014542 A1 | 1/2019 | Jain et al. | |
| 2019/0159116 A1 | 5/2019 | Guan et al. | |
| 2020/0154516 A1* | 5/2020 | Gambhir-Parekh | H04W 76/19 |
| 2023/0284170 A1* | 9/2023 | Jung | H04W 88/06 |
| | | | 370/329 |
| 2024/0137829 A1* | 4/2024 | Lin | H04W 36/144 |

FOREIGN PATENT DOCUMENTS

| | | | | |
|---|---|---|---|---|
| WO | 2015051157 A1 | 4/2015 | | |
| WO | 2015148711 A1 | 10/2015 | | |
| WO | 2016164149 A1 | 10/2016 | | |
| WO | WO-2017137058 A1 * | 8/2017 | | H04W 48/20 |
| WO | WO-2020197695 A1 * | 10/2020 | | H04W 76/16 |
| WO | WO-2021239895 A1 * | 12/2021 | | H04W 74/0833 |

* cited by examiner

MULTIPLE SUBSCRIBER IDENTITY MODULE (SIM) USER EQUIPMENT (UE) FORCED RADIO ACCESS TECHNOLOGY (RAT) SELECTION

FIELD OF THE DISCLOSURE

Aspects of the present disclosure generally relate to wireless communications, and more particularly to techniques and apparatuses for an improved method of sharing activity among subscriber identity modules (SIMS) of multiple subscriber identity module (MSIM) user equipment (UEs), such as dual SIM dual active (DSDA) and dual SIM dual standby (DSDS) UEs.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In one aspect of the present disclosure, a method of wireless communication by a user equipment (UE) supporting multiple subscriptions, includes camping on a first cell of a first radio access technology (RAT) with a first data subscription, and camping on a second cell of a second RAT with a second data subscription. The method also includes triggering a transition to the first cell of the first RAT for the second data subscription. The method further includes performing, with the first data subscription, activities on behalf of the second data subscription.

In other aspects, an apparatus for wireless communication by a user equipment (UE) supporting multiple subscriptions includes a memory and at least one processor coupled to the memory. The processor(s) and memory are configured to camp on a first cell of a first radio access technology (RAT) with a first data subscription, and camp on a second cell of a second RAT with a second data subscription. The processor(s) and memory are also configured to trigger a transition to the first cell of the first RAT for the second data subscription. The processor(s) and memory are further configured to perform, with the first data subscription, activities on behalf of the second data subscription.

In still other aspects, an apparatus for wireless communication by a user equipment (UE) supporting multiple subscriptions includes means for camping on a first cell of a first radio access technology (RAT) with a first data subscription, and means for camping on a second cell of a second RAT with a second data subscription. The apparatus also includes means for triggering a transition to the first cell of the first RAT for the second data subscription. The apparatus further includes means for performing, with the first data subscription, activities on behalf of the second data subscription.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
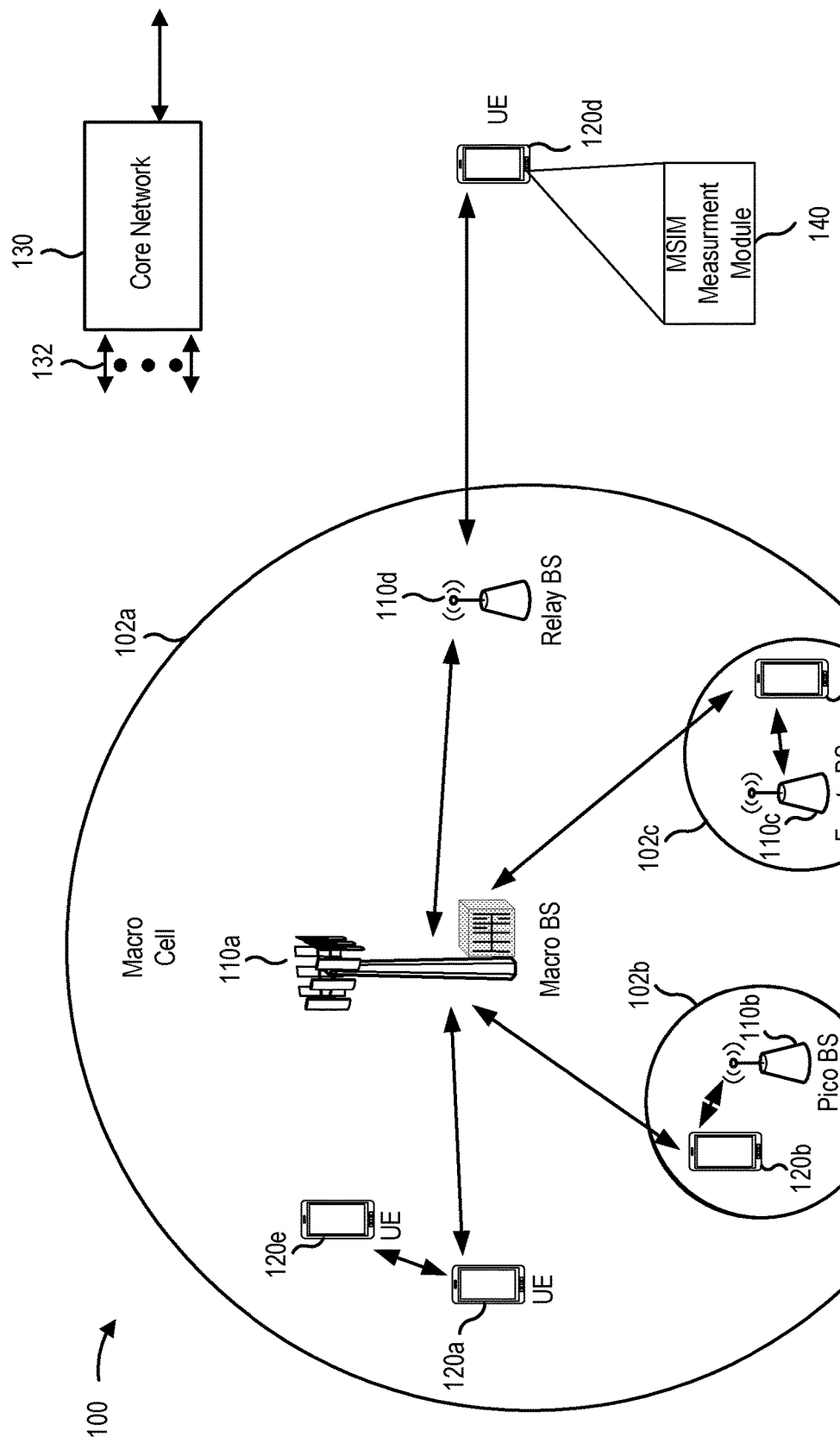
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

A multi-subscriber identity module (SIM) UE is an example of a UE with multiple mobile network subscriptions. For example, a UE may have a first subscription with Verizon Wireless and a second subscription with AT&T Wireless. Thus, the UE can connect to either or both of the mobile networks. An example use case of a multi-SIM device is a mobile phone with a first subscription dedicated to personal calls and a second subscription dedicated to business calls. Although the following description primarily refers to dual SIM devices, the present disclosure contemplates multi-SIM UEs with more than two SIMS.

According to aspects of the present disclosure, a forced radio access technology (RAT) transitioning method is proposed for a multi-SIM UE, such as a dual SIM, dual active (DSDA) UE, and a dual SIM, dual standby (DSDS) UE. A DSDA UE has two transceivers to allow connection to both subscriptions simultaneously. A DSDS UE has a single transceiver shared between the two SIMS to allow connection to one subscription at a time. For DSDS UEs, the processor manages both SIMS simultaneously, although communication does not simultaneously occur via both SIMS. Throughout this description, the terms 'SIM', 'data subscription,' and 'subscription' may be used interchangeably.

Handover is a radio resource control (RRC) connected mode mobility procedure for keeping the UE connected at all times. Cell reselection is an RRC idle mode mobility procedure to ensure the UE is camped on a cell at all times. As a pre-requisite for these procedures, the UE periodically performs measurements of neighbor cell strengths. The UE sends measurement reports for neighbors in radio resource control (RRC) connected mode and performs self-evaluation to move to a stronger neighbor cell in RRC idle mode. When the term 'measurement' or 'measure' is used, one or both of the actions of searching or measuring are contemplated.

Currently, a multi-subscriber identity module (MSIM) UE supports a default data subscription (DDS) performing idle activities for a non-DDS. As a result, the non-DDS can benefit from improved power consumption and throughput. For example, non-DDS idle activities performed by the DDS improve power consumption for the non-DDS because wakeups can be reduced. Moreover, the default data subscription does not need to open a measurement gap for the non-DDS to perform idle activities. Thus, the DDS is not interrupted and can provide better throughput performance compared with a MSIM UE without the feature.

The current feature specifies both subscriptions to camp on the same radio access technology (RAT). In some scenarios, however, two subscriptions may camp on different radio access technology (RATs). In these scenarios, the default data subscription cannot perform idle activities for the non-DDS, resulting in a performance loss with respect to both power consumption and throughput.

When the subscriptions are on different RATs, DSDS and DSDA UEs may perform individual neighbor cell searches and measurements for each subscription, which is inefficient in terms of the overall current and power consumption at the battery. The UEs may also be inefficient with respect to performance and throughput for the connected subscription. For example, with DSDS and DSDA UEs, additional sleep/wakeup overhead causes additional power drain by individual subscriptions in order to perform their own neighbor cell search and measurements.

In some aspects of the present disclosure, when a default data subscription (DDS) camps on cell A of radio access technology (RAT) X, and a non-DDS camps on a different RAT (e.g., RAT Y) and cell A is a suitable cell for the non-DDS, the UE forces the non-DDS to transition to RAT X, cell A. Then, the default data subscription (DDS) can perform activities on behalf of the non-DDS. RAT X and RAT Y can be any radio RAT supported by the non-DDS.

For example, the DDS may perform mobility activities, idle mode activities, paging monitoring, roaming activities, and/or radio access network (RAN) sharing processing on behalf of the non-DDS. Similarly, the non-DDS may perform activities on behalf of the DDS. Either or both of the subscriptions may be in idle mode or connected mode.

FIG. 1 is a diagram illustrating a network 100 in which aspects of the present disclosure may be practiced. The network 100 may be a 5G or NR network or some other wireless network, such as a long term evolution (LTE) network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a multi-SIM (MSIM) measurement module 140. For brevity, only one UE 120d is shown as including the MSIM measurement module 140. The MSIM measurement module 140 may be configured for camping on a first cell of a first radio access technology (RAT) with a first data subscription, and camp on a second cell of a second RAT with a second data subscription. The MSIM measurement module 140 may also trigger a reselection to the first cell of the first RAT for the second data subscription. The MSIM measurement module 140 may perform, with the first data subscription, activities on behalf of the second data subscription.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
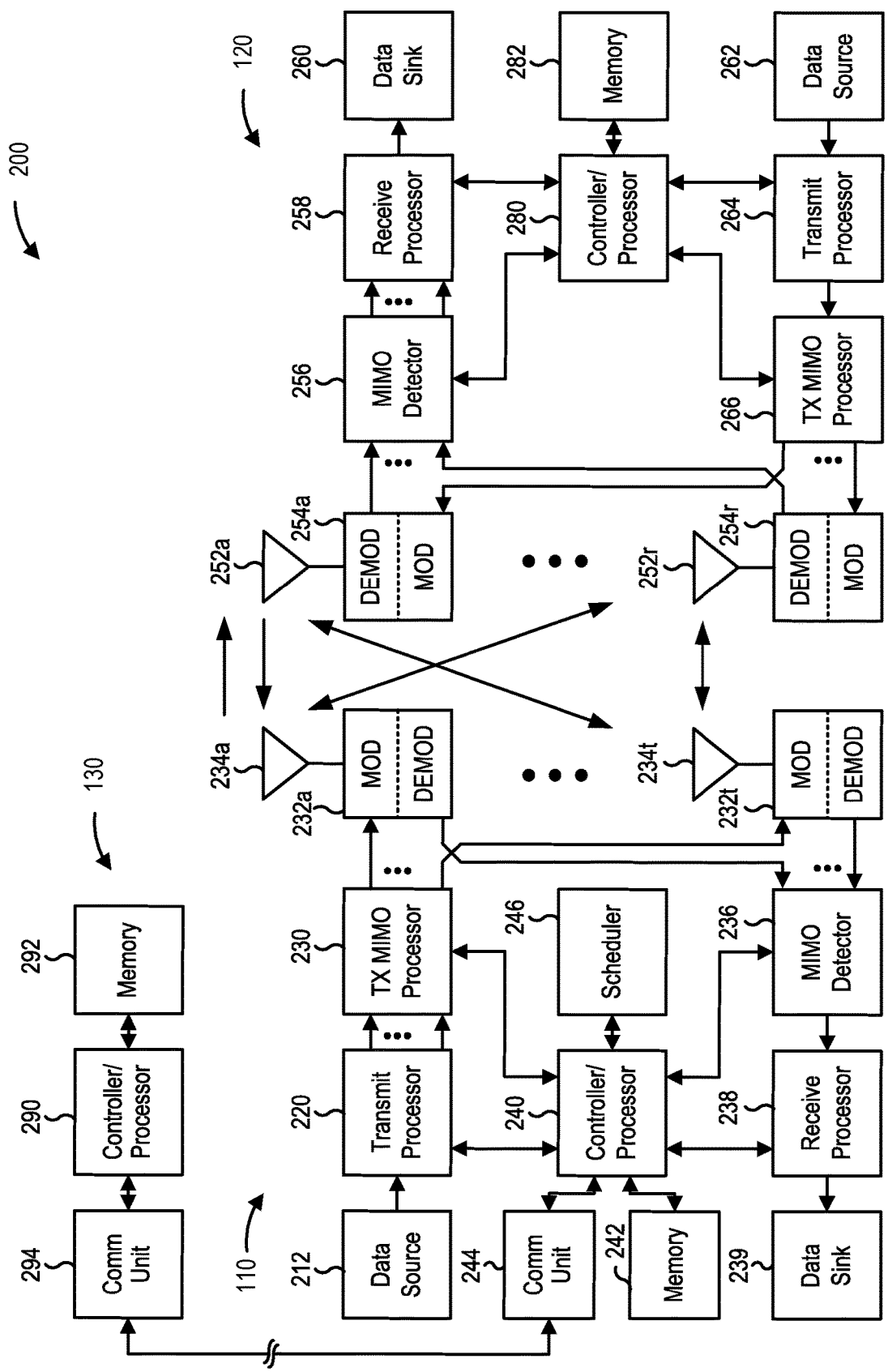
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the UE 120, and/or any other component(s) of FIG. 2 may perform one or more techniques associated with the improved MSIM UE techniques as described in more detail elsewhere. For example, the controller/processor 280 of the UE 120, and/or any other component(s) of FIG. 2 may perform or direct operations of, for example, the process of FIG. 7 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for camping, means for triggering, means for performing activities, means for reselecting, and means for transmitting. Such means may include one or more components of the UE 120 described in connection with FIG. 2.

As indicated above, FIG. 2 is provided merely as an example. Other examples may differ from what is described with regard to FIG. 2.

As described above, a multi-subscriber identity module (SIM) UE is a UE with multiple mobile network subscriptions. For example, a UE may have a first subscription with Verizon Wireless and a second subscription with AT&T Wireless. Thus, the UE can connect to either or both of the mobile networks. An example use case of a multi-SIM device is a mobile phone with a first subscription dedicated to personal calls and a second subscription dedicated to business calls. Although the following description primarily refers to dual SIM devices, the present disclosure contemplates multi-SIM UEs with more than two SIMS.

According to aspects of the present disclosure, a forced RAT transitioning method is proposed for a multi-SIM UE, such as a dual SIM, dual active (DSDA), and a dual SIM, dual standby (DSDS) UE. A DSDA UE has two transceivers to allow connection to both subscriptions simultaneously. A DSDS UE has a single transceiver shared between the two SIMS to allow connection to one subscription at a time. For DSDS UEs, the processor manages both SIMS simultaneously, although communication does not occur via both SIMS simultaneously. Throughout this description, the terms SIM,' data subscription,' and 'subscription' may be used interchangeably.

Handover is a radio resource control (RRC) connected mode mobility procedure for keeping the UE connected at all times. Cell reselection is an RRC idle mode mobility procedure to ensure the UE is camped on a cell at all times. As a pre-requisite for these procedures, the UE periodically performs measurements of neighbor cell strengths. The UE sends measurement reports for neighbors in radio resource control (RRC) connected mode and performs self-evaluation to move to a stronger neighbor cell in RRC idle mode. When the term 'measurement' or 'measure' is used, one or both of the actions of searching or measuring are contemplated.

Currently, a multi-subscriber identity module (MSIM) user equipment (UE) supports a default data subscription (DDS) performing idle activities for a non-DDS. As a result, the non-DDS can benefit from improved power consumption and throughput. For example, non-DDS idle activities performed by the default data subscription (DDS) improve power consumption for the non-DDS because wakeups can be reduced. Moreover, the default data subscription does not need to open a measurement gap for the non-DDS to perform idle activities. Thus, the DDS is not interrupted and can provide better throughput performance compared with a MSIM UE without the feature.

The current feature specifies both subscriptions to camp on the same radio access technology (RAT). In some scenarios, however, two subscriptions may camp on different RATs. In these scenarios, the default data subscription cannot perform idle activities for the non-DDS, resulting in a performance loss with respect to both power consumption and throughput.

When the subscriptions are on different RATs, DSDS and DSDA UEs may perform individual neighbor cell searches and measurements for each subscription, which is inefficient in terms of the overall current and power consumption at the battery. The UEs may also be inefficient with respect to performance and throughput for the connected subscription. For example, with DSDS and DSDA UEs, additional sleep/wakeup overhead causes additional power drain by individual subscriptions in order to perform their own neighbor cell search and measurements.

In some aspects of the present disclosure, a default data subscription (DDS) camps on cell A of radio access technology (RAT) X and a non-DDS camps on a different RAT (e.g., RAT Y). In such aspects, if cell A is a suitable cell for the non-DDS, the UE forces the non-DDS to transition to RAT X in cell A. Then, the DDS can perform activities on behalf of the non-DDS. RAT X and RAT Y can be any RAT supported by the non-DDS.

The activities performed by the DDS on behalf of the non-DDS may be, for example, mobility activities, idle mode activities, paging monitoring, roaming activities, and/or radio access network (RAN) sharing processing Similarly, the non-DDS may perform activities on behalf of the DDS, instead of vice versa. Either or both of the subscriptions may be in idle mode or connected mode.

A measurement process specifies radio frequency (RF) tuning to frequencies of respective radio access technologies (RATs) and tuning back to the serving cell frequency for each measurement interval. In a connected state, the measurement uses network configured gaps or gapless measurements. A larger number of gaps configured during connected mode causes more power drain at the battery. In idle mode, the UE performs its measurements during the intervals between discontinuous reception (DRX) cycles. More frequent UE wakeups for such measurements increase power drain. The power drain due to the measurements becomes more pronounced if the UE has multiple SIM cards as the UE performs measurements for both subscriptions.

Figure 3:
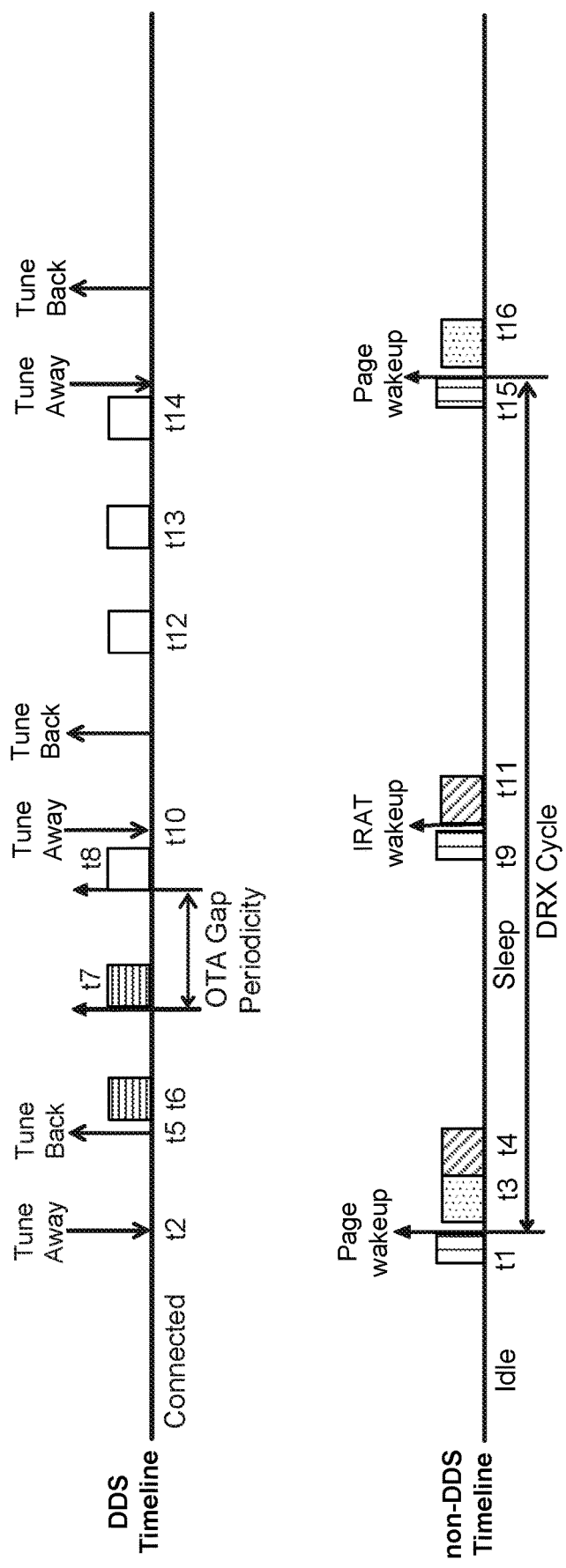
FIG. 3 is a diagram illustrating timelines for a dual subscriber identity module (SIM) UE performing neighbor measurements, in accordance with various aspects of the present disclosure.

FIG. 3 is a diagram illustrating timelines for a dual subscriber identity module (SIM) UE performing neighbor measurements. In the example of FIG. 3, a multi-SIM (MSIM) UE includes a first subscription (e.g., a default data subscription (DDS)) performing neighbor measurements in network over-the-air (OTA) gaps at a measurement gap periodicity of 40 ms or 80 ms. Also, a second subscription (e.g., a non-DDS) performs neighbor measurements in idle mode, after a page operation or during a separate wakeup.

In the example of FIG. 3, the default data subscription (DDS) is in connected mode and the non-DDS is in idle mode. At time t1, the non-DDS wakes up from sleep mode and prepares to check whether a page is received, in other words, whether there is an incoming call. At time t2, the UE tunes away from the DDS to the non-DDS. The non-DDS wakes for the page and at time t3, decodes any incoming page. The UE also addresses mobility while the non-DDS is awake. In other words, at time t4, the UE measures neighbors for the non-DDS, before the UE tunes back to the DDS at time t5. At times t6 and t7, the UE measures neighbor cells for the DDS during over the air (OTA) measurement gaps. The periodicity of a single OTA measurement gap is shown between times t7 and t8. At time t8, an OTA gap remains unused. In other words, no measurement is performed.

At time t9, the UE prepares for its next wakeup for the non-DDS measurements. After the tune away at time t10, the UE performs measurements of neighbor cells for the non-DDS. After tuning back to the DDS, three unused OTA measurement gaps occur at times t12, t13, and t14 before the UE again wakes up the non-DDS and prepares to check for a page at time t15. After the tune away, at time t16, the UE decodes any incoming page for the non-DDS and the process continues. It is noted that a DRX cycle for the non-DDS is shown between times t1 and t16. As can be seen from the example in FIG. 3, the UE wakes up the non-DDS for a measurement at times t9 and t11, while unused measurement gaps exist for the DDS at times t8, t12, t13, and t14.

A common framework enables a neighbor cell measurement configuration to remove the inefficiencies noted with respect to the procedure shown in FIG. 3. Measurement results may be shared across subscriptions so that performance and power impact is improved or even optimized. That is, there are fewer additional wakeups and tune aways, and any redundancy may be reduced or even eliminated. The procedures may be based on a subscriptions state (e.g., idle/connected) and connected subscription traffic state (e.g., high traffic or low traffic). The procedures may also be based on a number of configured intra/inter radio access technology (IRAT) measurement frequencies for each subscription, as well as time to measure specifications configured for each subscription. When both subscriptions are idle, one of the subscriptions may utilize DRX cycle gaps to measure frequencies on behalf of other subscriptions. The UE may perform multiple frequency measurements in parallel to complete the measurements.

Figure 4:
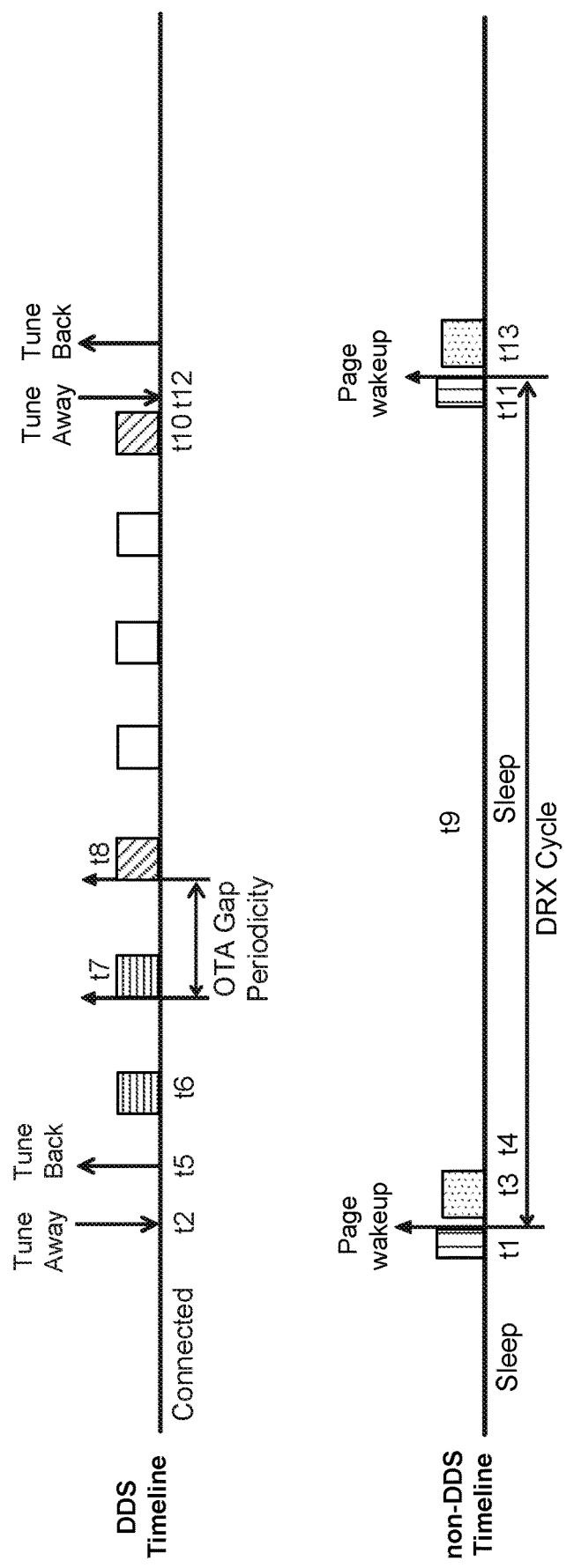
FIG. 4 is a diagram illustrating timelines for a dual SIM UE performing neighbor measurements during measurement gaps, in accordance with aspects of the present disclosure.

FIG. 4 is a diagram illustrating timelines for a dual SIM UE performing neighbor measurements during measurement gaps, in accordance with aspects of the present disclosure. In the example of FIG. 4 a multi-SIM (MSIM) UE includes a first subscription (e.g., a default data subscription (DDS)) performing neighbor measurements in network over-the-air (OTA) gaps at a measurement gap periodicity of 40 ms or 80 ms. The DDS subscription also performs neighbor measurements for a second subscription (e.g., a nonDDS), in the measurement gaps configured for the DDS. As a result, the UE completes measurements for both subscriptions faster than the scenario shown in FIG. 3. The non-DDS subscription does not perform any measurement activities, saving wakeups and saving tune aways for the DDS subscription, which improves both power savings and throughput.

In the example of FIG. 4, the default data subscription (DDS) is in connected mode and the non-DDS is in idle mode. At time t1, the non-DDS wakes up from sleeping and prepares to check whether a page is received. At time t2, the UE tunes away from the DDS to the non-DDS. At time t3, the non-DDS searches for paging and decodes any incoming page. In the example of FIG. 4, the UE does not address mobility at time t4. Rather, the UE tunes back to the DDS at time t5, which occurs immediately after page decoding at time t3. At times t6 and t7, the UE measures neighbor cells for the DDS during over the air (OTA) measurement gaps. The periodicity of a single OTA measurement gap is shown between times t7 and t8. At time t8, the UE measures neighbor cells with the DDS on behalf of the non-DDS. Thus, at time t9, the UE does not wake up for non-DDS measurements. Rather, after the UE measures neighbor cells with the DDS on behalf of the non-DDS at time t10, the UE continues to sleep until it is time to wake up the non-DDS and prepare to check for a page at time t11. After the tune away, at time t12, the UE decodes any incoming page for the non-DDS at time t13 and the process continues. It is noted that a DRX cycle for the non-DDS is shown between times t1 and t13, and does not include any interruptions for measuring of neighbor cells for the non-DDS.

Figure 5:
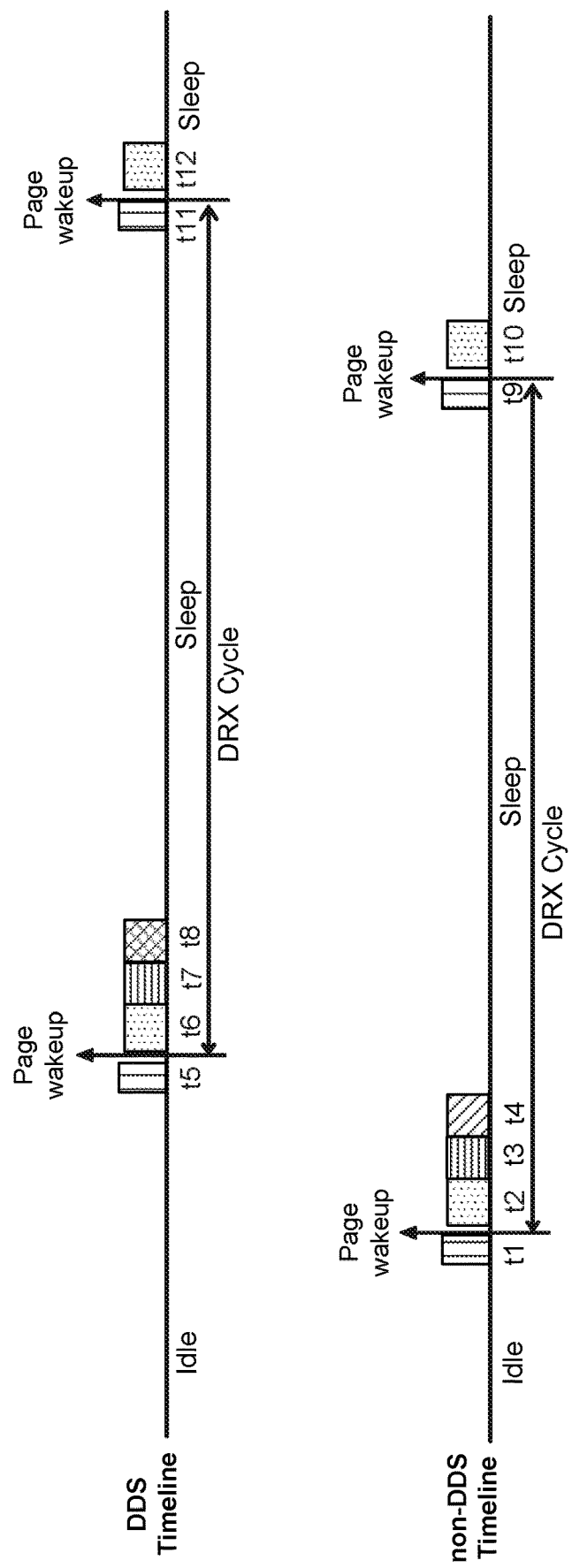
FIG. 5 is a diagram illustrating timelines for a dual SIM UE performing measurements of common neighbors, in accordance with aspects of the present disclosure.

FIG. 5 is a diagram illustrating timelines for a dual SIM UE performing measurements of common neighbors, in accordance with aspects of the present disclosure. In the example of FIG. 5, both the default data subscription (DDS) and the non-DDS are in idle mode. The DDS performs neighbor measurements in idle mode for both its neighbors and the non-DDS neighbors. The non-DDS performs measurement activities of its own neighbors as well as for DDS neighbors. This procedure saves a number of wakeups, improving power consumption, and completes the neighbor measurements faster than if each subscription only measured its own neighbor cells. In the procedure shown in FIG. 5, if wakeups for the two SIMS coincide, one subscription can take care of measurements for the other subscription, avoiding band conflicts or resource conflicts. In case both subscriptions are to the same operator, a common neighbor need not be measured again by another subscription.

At time t1, the non-DDS wakes up from sleeping and prepares to check whether a page is received. At time t2, the UE decodes any incoming page for the non-DDS. At time t3, the non-DDS measures neighbor cells on behalf of the DDS and at time t4, the non-DDS measures its own neighbor cells. At time t5, the DDS wakes up from sleeping and prepares to check whether a page is received. At time t6, the UE decodes any incoming page for the DDS. At time t7, the DDS measures its own neighbor cells. At time t8, the UE measures common neighbor cells, which are cells that are neighbors for the DDS and also neighbors for the non-DDS. At time t9, the UE wakes up the non-DDS and prepares to check for a page at time t10. At time t11, the UE wakes up the DDS and prepares to check for a page at time t12. It is noted that a DRX cycle for the DDS is shown between times t5 and t11 and the DRX cycle for the non-DDS is shown between times t1 and t9.

According to aspects of the present disclosure, when a default data subscription (DDS) camps on a cell of a first radio access technology (RAT) (e.g., RAT X, cell A), and a non-DDS camps on a second RAT (e.g., RAT Y), and the cell of the first RAT is a suitable cell for the non-DDS, the UE forces the non-DDS to reselect to the cell of the first RAT (e.g., RAT X, cell A). Then, the default data subscription (DDS) can perform activities for the non-DDS sub. RAT X and RAT Y can be any RAT supported by the non-DDS.

For example, the DDS may perform mobility activities, idle mode activities, paging monitoring, roaming activities, background public land mobile network (PLMN) activities, tracking area reporting, and/or radio access network (RAN) sharing processing on behalf of the non-DDS. The connected mode activities may include measurement. For example, if both subscriptions operate in the same cell, only one subscription has to measure the cell. Similarly, the non-DDS may perform any of these activities on behalf of the DDS. Either or both of the subscriptions may be in idle mode or connected mode. If both subscriptions are in connected mode, a benefit of operating on the same cell may be that the second subscription need not tune away for measurements due to the fact that the channel conditions for each cell are the same. Only one subscription has to measure the cell.

In some aspects, when the default data subscription (DDS) performs idle activities for the non-DDS, the user equipment (UE) may wake up only one time and save power. This process is referred to as merging idle mode activities. Merging of a DDS and non-DDS idle activities will help the UE to wake up once to perform idle activities for both the DDS and non-DDS, saving power. For example, one subscription may perform mobility measurements for both subscriptions and/or one subscription may tune away for the other subscription, in order to measure another frequency or RAT.

According to aspects of the present disclosure, the UE triggers a transition from a different RAT to a RAT that can facilitate merging of paging procedures. Page merging may include one subscription monitoring for a page for both subscriptions. For example, in some scenarios, the default data subscription (DDS) camps on RAT X, cell A, and the non-DDS is on RAT Y. According to aspects of the present disclosure, the UE forces the non-DDS to transition from a cell of RAT Y to cell A of RAT X, allowing the UE to merge the page monitoring whenever both the DDS and non-DDS subscribe to the same carrier. The DDS and non-DDS page merging will help the UE to wake up only one time to monitor pages for both the DDS and non-DDS, thus saving power.

According to further aspects of the present disclosure, the UE triggers a RAT transition for each subscription. For example, the UE transitions the DDS and non-DDS from their current RAT to a RAT that can facilitate page merging. In some scenarios, the default data subscription (DDS) transitions from code division multiple access (CDMA) single-carrier radio transmission technology (1×RTT) to long term evolution (LTE) and the non-DDS is on wideband CDMA (WCDMA). Aspects of the present disclosure force a transition from WCDMA to an LTE cell that allows the UE to merge page monitoring for both subscriptions. Assuming both subscriptions can camp on the same cell, the UE can merge roaming and radio access network (RAN) sharing activities as well. Because both subscriptions are on the same cell, the cell conditions for both subscriptions are the same. Thus, measurements are not specified for the second subscription because the measurements may be redundant.

In this example, the DDS transitions from 1×RTT to LTE and the non-DDS transitions from WCDMA to LTE. That is, the default data subscription (DDS) and non-DDS are merged to the same radio access technology (RAT) from two different RATs. Thus, three different RATs are involved. In some aspects, the transition may help a UE more quickly receive service on a better RAT. In this example, LTE is better than both WCDMA and 1×RTT.

Aspects of the present disclosure apply to different RATs. For example, the improved RAT may be 5G new radio (NR), which also supports page merging. In this example, the DDS may transition from 1×RTT to LTE, while the non-DDS transfers from NR to LTE.

If a subscription is in idle mode, cell reselection is triggered, as described. However, if a subscription is in connected mode, the UE may transition RATs with a redirection process. In other aspects, the UE may disconnect from the network and transition via an inter-radio access technology (IRAT) reselection process.

Benefits of the present disclosure include improving an ability for a multi-subscriber identity module (MSIM) user equipment (UE) to trigger the default data subscription (DDS) to perform idle activities for the non-DDS, thus improving both power consumption and throughput. Other benefits include improving an ability of a multi-subscriber identity module (MSIM) user equipment (UE) to trigger the default data subscription (DDS) to perform page monitoring for the non-DDS to improve power consumption and throughput. A MSIM UE may also more easily trigger a merger of multiple (e.g., three or more) radio access technologies (RATs) to improve service on a better RAT for multiple subscriptions. Although the description has been with respect to two subscriptions, the present disclosure also contemplates three or more subscriptions.

Figure 6:
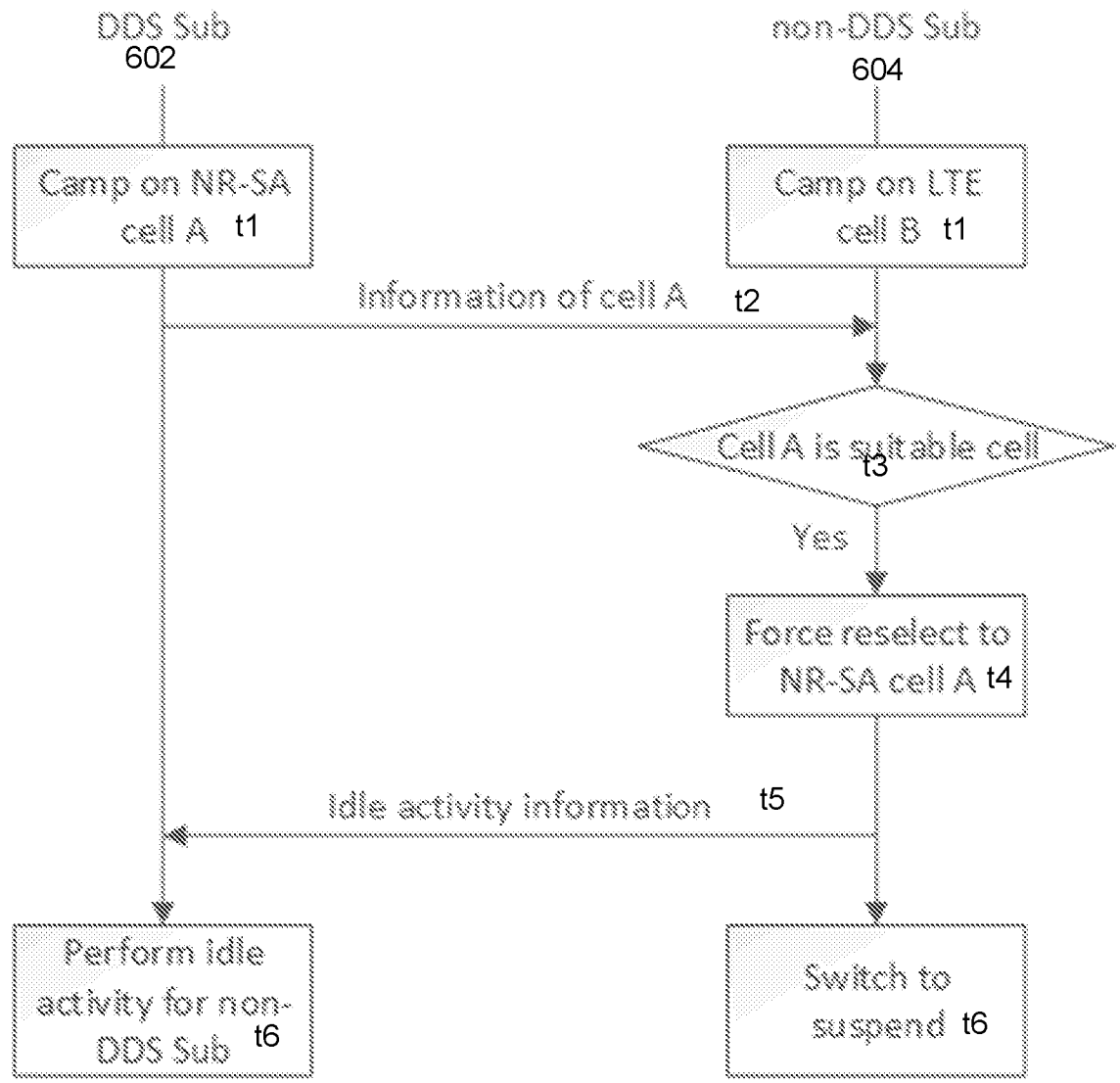
FIG. 6 is a timing diagram illustrating forced triggering of cell reselection, in accordance with aspects of the present disclosure.

FIG. 6 is a timing diagram illustrating forced triggering of cell reselection, in accordance with aspects of the present disclosure. In FIG. 6, a default data subscription (DDS) 602 camps on new radio standalone (NR-SA) cell A, at time t1. A non-DDS 604 camps on LTE cell B, also at time t1. At time t2, the DDS 602 transmits information about cell A to the non-DDS 604. The DDS 602 and non-DDS 604 may be associated with the same modem or with different modems.

Based on the information received at time t2, at time t3, the non-DDS 604 determines whether cell A is suitable for the non-DDS 604. If cell A is a suitable cell for the non-DDS 604, the modem can force trigger the non-DDS 604 to reselect to new radio standalone (NR-SA) cell A, at time t4. At time t5, the non-DDS 604 transmits idle activity information to the DDS 602. With this information, the DDS 602 can perform idle activities for the non-DDS 604, at time t6. The non-DDS 604 may also switch to a suspended state at time t6.

As indicated above, FIGS. 3-6 are provided as examples. Other examples may differ from what is described with respect to FIGS. 3-6.

Figure 7:
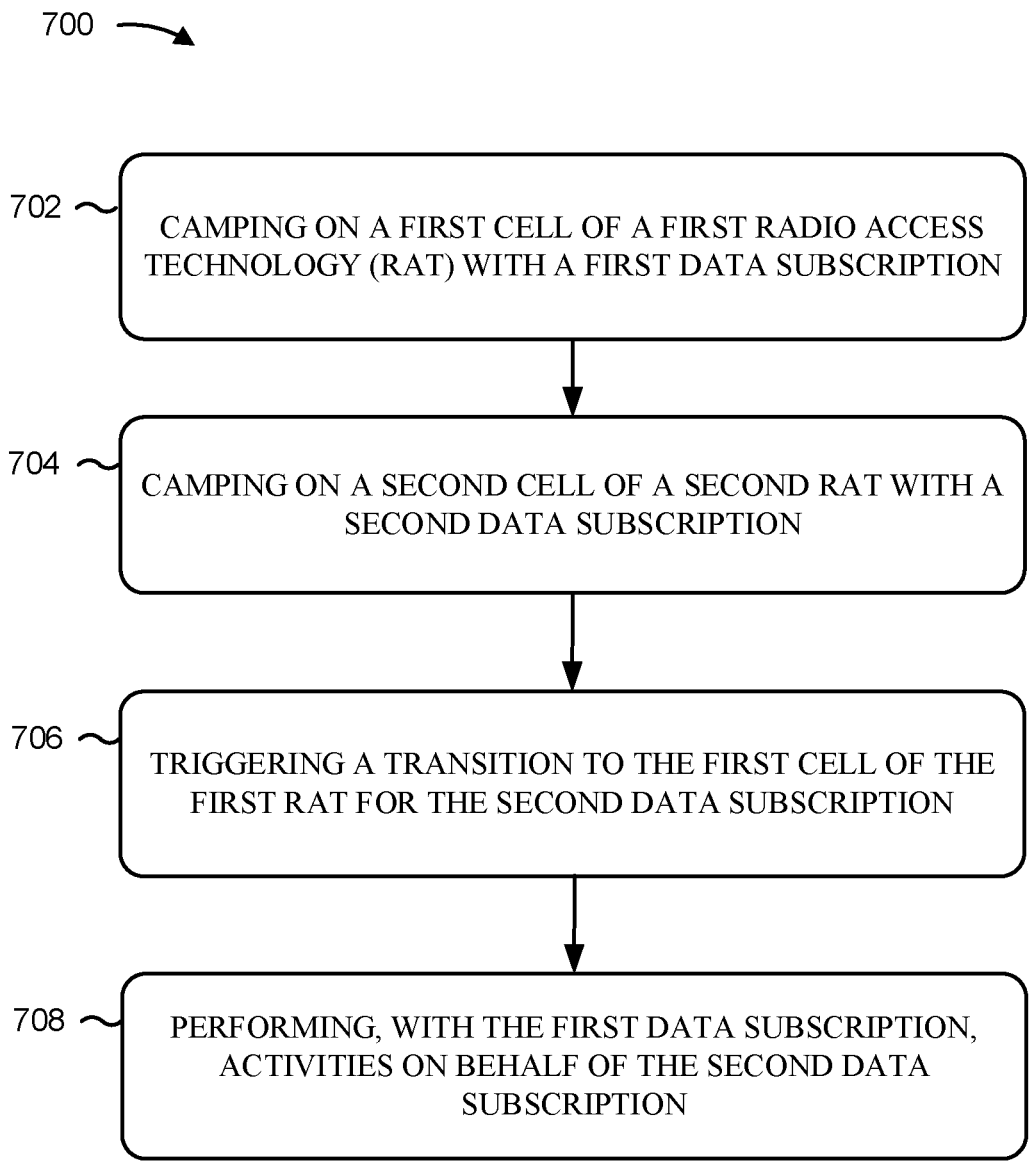
FIG. 7 is a flow diagram illustrating an example process performed, for example, by a multi-SIM UE, in accordance with various aspects of the present disclosure.

FIG. 7 is a flow diagram illustrating an example process 700 performed, for example, by a multi-SIM UE, in accordance with various aspects of the present disclosure. The example process 700 is an example of an improved neighbor measurement method for multiple subscriber identity module (SIM) user equipments (UEs), such as dual SIM dual active (DSDA) and dual SIM dual standby (DSDS) UEs. The operations of the process 700 may be implemented by a UE 120.

At block 702, the user equipment (UE) camps on a first cell of a first radio access technology (RAT) with a first data subscription. For example, the UE (e.g., using the antenna 252, modulator/demodulator (MOD/DEMOD) 254, the transmit processor 264, TX multiple-input multiple-output (MIMO) processor 266, MIMO detector 256, receive processor 258, the controller/processor 280, memory 282, and/ or the like) may camp on the first cell of the first RAT with the first data subscription. In some aspects, the first subscription is a default data subscription (DDS). The first subscription may be in idle or connected mode. In some aspects, the UE transitions the first subscription from a third RAT to the first RAT, prior to camping on the first RAT.

At block 704, the user equipment (UE) camps on a second cell of a second RAT with a second data subscription. For example, the UE (e.g., using the antenna 252, modulator/ demodulator (MOD/DEMOD) 254, the transmit processor 264, TX multiple-input multiple-output (MIMO) processor 266, MIMO detector 256, receive processor 258, controller/ processor 280, memory 282, and/or the like) may camp on the second cell of the second RAT with the second data subscription. In some aspects, the second subscription is a non-default data subscription (non-DDS). The second subscription may be in idle mode or connected mode.

At block 706, the user equipment (UE) triggers a transition to the first cell of the first RAT for the second data subscription. For example, the UE (e.g., using the antenna 252, modulator/demodulator (MOD/DEMOD) 254, the transmit processor 264, TX multiple-input multiple-output (MIMO) processor 266, MIMO detector 256, receive processor 258, controller/processor 280, memory 282, and/or the like) may trigger the transition to the first cell of the first RAT for the second data subscription. The triggering may occur in response to determining the first cell of the first RAT is suitable for merging activities with the second data subscription.

At block 708, the user equipment (UE) performs, with the first data subscription, activities on behalf of the second data subscription. For example, the UE (e.g., using the antenna 252, modulator/demodulator (MOD/DEMOD) 254, the transmit processor 264, TX multiple-input multiple-output (MIMO) processor 266, MIMO detector 256, receive processor 258, controller/processor 280, memory 282, and/or the like) may perform activities on behalf of the second data subscription. The activities may be idle activities and may include merging page monitoring and/or merging idle mode activities.

Implementation examples are described in the following numbered clauses.

1. A method of wireless communication by a user equipment (UE) supporting a plurality of data subscriptions, comprising:
   camping on a first cell of a first radio access technology (RAT) with a first data subscription;
   camping on a second cell of a second RAT with a second data subscription;
   triggering a transition to the first cell of the first RAT for the second data subscription; and
   performing, with the first data subscription, activities on behalf of the second data subscription.
2. The method of clause 1, in which performing activities comprises performing idle mode activities by merging first idle mode activities of the first data subscription with second idle mode activities of the second data subscription.
3. The method of clause 1 or 2, in which performing activities comprises performing idle mode activities by merging first page monitoring for the first data subscription with second page monitoring for the second data subscription.
4. The method of clause 1, 2, or 3, further comprising transitioning the first data subscription from a third RAT to the first RAT, prior to camping on the first RAT.
5. The method of any of clauses 1-4, in which the first data subscription is in idle mode and the transition comprises reselection.
6. The method of any of clauses 1-4, in which the first data subscription is in connected mode and the transition comprises redirection.
7. The method of any of clauses 1-6, further comprising disconnecting the second data subscription, which is in connected mode, prior to triggering the transition, the transition comprising reselection.
8. The method of any of clauses 1-7, in which triggering the transition occurs in response to determining the first cell of the first RAT is suitable for merging activities with the second data subscription.
9. The method of any of clauses 1-8, further comprising transmitting idle activity information from a second modem corresponding to the second data subscription to a first modem corresponding to the first data subscription, after triggering the transition.
10. The method of any of clauses 1-9, in which the first data subscription is a default data subscription (DDS), and the second data subscription is a non-DDS.
11. The method of any of clauses 1-9 in which the second data subscription is a default data subscription (DDS), and the first data subscription is a non-DDS.
12. An apparatus for wireless communication by a user equipment (UE) supporting a plurality of subscriptions, comprising:
   a memory; and
   at least one processor coupled to the memory, the at least one processor configured:
   to camp on a first cell of a first radio access technology (RAT) with a first data subscription;
   to camp on a second cell of a second RAT with a second data subscription;
   to trigger a transition to the first cell of the first RAT for the second data subscription; and
   to perform, with the first data subscription, activities on behalf of the second data subscription.
13. The apparatus of clause 12, in which the at least one processor is further configured to perform activities by merging first idle mode activities of the first data subscription with second idle mode activities of the second data subscription.
14. The apparatus of clause 12 or 13, in which the at least one processor is further configured to perform activities by merging first page monitoring for the first data subscription with second page monitoring for the second data subscription.
15. The apparatus of clause 12, 13, or 14, in which the at least one processor is further configured to transition the first data subscription from a third RAT to the first RAT, prior to camping on the first RAT.
16. The apparatus of any of clauses 12-15, in which the first data subscription is in idle mode and the transition comprises reselection.
17. The apparatus of any of clauses 12-15, in which the first data subscription is in connected mode and the transition comprises redirection.
18. The apparatus of any of clauses 12-17, in which the at least one processor is further configured to disconnect the second data subscription, which is in connected mode, prior to triggering the transition, the transition comprising reselection.
19. The apparatus of any of clauses 12-18, in which the at least one processor is configured to trigger the transition in response to determining the first cell of the first RAT is suitable for merging activities with the second data subscription.
20. The apparatus of any of clauses 12-19, in which the at least one processor is further configured to transmit idle activity information from a second modem corresponding to the second data subscription to a first modem corresponding to the first data subscription, after triggering the transition.
21. The apparatus of any of clauses 12-20, in which the first data subscription is a default data subscription (DDS), and the second data subscription is a non-DDS.
22. The apparatus of any of clauses 12-20, in which the second data subscription is a default data subscription (DDS), and the first data subscription is a non-DDS.

23. An apparatus comprising:
- means for camping on a first cell of a first radio access technology (RAT) with a first data subscription;
- means for camping on a second cell of a second RAT with a second data subscription;
- means for triggering a transition to the first cell of the first RAT for the second data subscription; and
- means for performing, with the first data subscription, activities on behalf of the second data subscription.

24. The apparatus of clause 23, in which the means for performing activities further comprises means for performing idle mode activities by merging first idle mode activities of the first data subscription with second idle mode activities of the second data subscription.

25. The apparatus of clause 23 or 24, in which the means for performing activities further comprises means for performing idle mode activities by merging first page monitoring for the first data subscription with second page monitoring for the second data subscription.

26. The apparatus of clause 23, 24, or 25, further comprising means for transitioning the first data subscription from a third RAT to the first RAT, prior to camping on the first RAT.

27. The apparatus of any of clauses 23-26, in which the first data subscription is in idle mode and the transition comprises reselection.

28. The apparatus of any of clauses 23-26, in which the first data subscription is in connected mode and the transition comprises redirection.

29. The apparatus of any of clauses 23-28, further comprising means for disconnecting the second data subscription, which is in connected mode, prior to triggering the transition, the transition comprising reselection.

30. The apparatus of any of clauses 23-29, in which the means for triggering the transition operates in response to determining the first cell of the first RAT is suitable for merging activities with the second data subscription.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE) supporting a plurality of data subscriptions, comprising:
- camping on a first cell of a first radio access technology (RAT) with a first data subscription;
- camping on a second cell of a second RAT with a second data subscription;
- triggering a transition to the first cell of the first RAT for the second data subscription; and
- performing, with the first data subscription, activities on behalf of the second data subscription.

2. The method of claim 1, in which performing activities comprises performing idle mode activities by merging first idle mode activities of the first data subscription with second idle mode activities of the second data subscription.

3. The method of claim 1, in which performing activities comprises performing idle mode activities by merging first page monitoring for the first data subscription with second page monitoring for the second data subscription.

4. The method of claim 1, further comprising transitioning the first data subscription from a third RAT to the first RAT, prior to camping on the first RAT.

5. The method of claim 4, in which the first data subscription is in idle mode and the transition comprises reselection.

6. The method of claim 4, in which the first data subscription is in connected mode and the transition comprises redirection.

7. The method of claim 1, further comprising disconnecting the second data subscription, which is in connected mode, prior to triggering the transition, the transition comprising reselection.

8. The method of claim 1, in which triggering the transition occurs in response to determining the first cell of the first RAT is suitable for merging activities with the second data subscription.

9. The method of claim 1, further comprising transmitting idle activity information from a second modem corresponding to the second data subscription to a first modem corresponding to the first data subscription, after triggering the transition.

10. The method of claim 1, in which the first data subscription is a default data subscription (DDS), and the second data subscription is a non-DDS.

11. The method of claim 1, in which the second data subscription is a default data subscription (DDS), and the first data subscription is a non-DDS.

12. An apparatus for wireless communication by a user equipment (UE) supporting a plurality of subscriptions, comprising:
a memory; and
at least one processor coupled to the memory, the at least one processor configured:
to camp on a first cell of a first radio access technology (RAT) with a first data subscription;
to camp on a second cell of a second RAT with a second data subscription;
to trigger a transition to the first cell of the first RAT for the second data subscription; and
to perform, with the first data subscription, activities on behalf of the second data subscription.

13. The apparatus of claim 12, in which the at least one processor is further configured to perform activities by merging first idle mode activities of the first data subscription with second idle mode activities of the second data subscription.

14. The apparatus of claim 12, in which the at least one processor is further configured to perform activities by merging first page monitoring for the first data subscription with second page monitoring for the second data subscription.

15. The apparatus of claim 12, in which the at least one processor is further configured to transition the first data subscription from a third RAT to the first RAT, prior to camping on the first RAT.

16. The apparatus of claim 15, in which the first data subscription is in idle mode and the transition comprises reselection.

17. The apparatus of claim 15, in which the first data subscription is in connected mode and the transition comprises redirection.

18. The apparatus of claim 12, in which the at least one processor is further configured to disconnect the second data subscription, which is in connected mode, prior to triggering the transition, the transition comprising reselection.

19. The apparatus of claim 12, in which the at least one processor is configured to trigger the transition in response to determining the first cell of the first RAT is suitable for merging activities with the second data subscription.

20. The apparatus of claim 12, in which the at least one processor is further configured to transmit idle activity information from a second modem corresponding to the second data subscription to a first modem corresponding to the first data subscription, after triggering the transition.

21. The apparatus of claim 12, in which the first data subscription is a default data subscription (DDS), and the second data subscription is a non-DDS.

22. The apparatus of claim 12, in which the second data subscription is a default data subscription (DDS), and the first data subscription is a non-DDS.

23. An apparatus comprising:
means for camping on a first cell of a first radio access technology (RAT) with a first data subscription;
means for camping on a second cell of a second RAT with a second data subscription;
means for triggering a transition to the first cell of the first RAT for the second data subscription; and
means for performing, with the first data subscription, activities on behalf of the second data subscription.

24. The apparatus of claim 23, in which the means for performing activities further comprises means for performing idle mode activities by merging first idle mode activities of the first data subscription with second idle mode activities of the second data subscription.

25. The apparatus of claim 23, in which the means for performing activities further comprises means for performing idle mode activities by merging first page monitoring for the first data subscription with second page monitoring for the second data subscription.

26. The apparatus of claim 23, further comprising means for transitioning the first data subscription from a third RAT to the first RAT, prior to camping on the first RAT.

27. The apparatus of claim 26, in which the first data subscription is in idle mode and the transition comprises reselection.

28. The apparatus of claim 26, in which the first data subscription is in connected mode and the transition comprises redirection.

29. The apparatus of claim 23, further comprising means for disconnecting the second data subscription, which is in connected mode, prior to triggering the transition, the transition comprising reselection.

30. The apparatus of claim 23, in which the means for triggering the transition operates in response to determining the first cell of the first RAT is suitable for merging activities with the second data subscription.

\* \* \* \* \*